(12) United States Patent
Erva et al.

(10) Patent No.: US 7,765,076 B2
(45) Date of Patent: *Jul. 27, 2010

(54) ALLOCATING PROCESSING UNITS TO PROCESSING CLUSTERS TO GENERATE SIMULATED DIFFRACTION SIGNALS

(75) Inventors: Hemalatha Erva, Fremont, CA (US); Hong Qiu, Union City, CA (US); Junwei Bao, Palo Alto, CA (US); Vi Vuong, Fremont, CA (US)

(73) Assignee: Tokyo Electron Limited, Tokyo (JP)

( * ) Notice: Subject to any disclaimer, the term of this patent is extended or adjusted under 35 U.S.C. 154(b) by 748 days.

This patent is subject to a terminal disclaimer.

(21) Appl. No.: 11/525,793

(22) Filed: Sep. 22, 2006

(65) Prior Publication Data

US 2008/0115140 A1    May 15, 2008

(51) Int. Cl.
*G01N 37/00* (2006.01)
(52) U.S. Cl. .................................................... 702/81
(58) Field of Classification Search .................. 702/81, 702/82, 83, 84, 94, 127, 189; 700/95, 96, 700/121; 356/600–636; 438/14, 16; 348/14
See application file for complete search history.

(56) References Cited

U.S. PATENT DOCUMENTS

| | | | |
|---|---|---|---|
| 6,785,638 | B2 | 8/2004 | Niu et al. |
| 6,891,626 | B2 | 5/2005 | Niu et al. |
| 6,943,900 | B2 | 9/2005 | Niu et al. |
| 7,330,279 | B2 * | 2/2008 | Vuong et al. ................. 356/625 |
| 7,394,554 | B2 * | 7/2008 | Vuong et al. ................. 356/625 |
| 2004/0017574 | A1 | 1/2004 | Vuong et al. |
| 2004/0267397 | A1 | 12/2004 | Doddi et al. |
| 2005/0209816 | A1 | 9/2005 | Vuong et al. |

OTHER PUBLICATIONS

Li, L. (1996). "Formulation and comparison of two recursive matrix algorithms for modeling layered diffraction gratings," *Journal of the Optical Society of America A* 13:1024-1035.
Haykin, S. (1999). *Neural Networks.* 2nd edition, M. Horton ed., Prentice Hall: Upper Saddle River, New Jersey, 9 pages (Table of Contents).
Ausschnitt, C. P. (Feb. 23, 2004). "A New Approach to Pattern Metrology," *Proceedings of SPIE* 5375:51-65.

* cited by examiner

*Primary Examiner*—Aditya Bhat
(74) *Attorney, Agent, or Firm*—Manuel B. Madriaga (57) ABSTRACT

In allocating processing units, first and second requests for jobs are obtained. First and second numbers of processing units requested are determined. First and second numbers of available processing units are determined. When the first number of available processing units is non-zero, the first number of available number of processing units or the first number of processing units requested is assigned to a first processing cluster. A first processing unit in the first processing cluster is designated as a master node. When the second number of available processing units is non-zero, the second number of available number of processing units or the second number of processing units requested is assigned to a second processing cluster. The first processing unit in the second processing cluster is designated as a slave node. The first and second jobs are assigned to the first and second processing clusters, respectively.

21 Claims, 5 Drawing Sheets

ALLOCATING PROCESSING UNITS TO PROCESSING CLUSTERS TO GENERATE SIMULATED DIFFRACTION SIGNALS

CROSS REFERENCES TO RELATED APPLICATIONS

This application relates to co-pending U.S. patent application Ser. No. 11/493,290 entitled ALLOCATING PROCESSING UNITS TO GENERATE SIMULATED DIFFRACTION SIGNALS USED IN OPTICAL METROLOGY, by Erva, et al., filed on Jul. 25, 2006, owned by the assignee of this application and incorporated herein by reference.

BACKGROUND

1. Field

The present application generally relates to optical metrology, and, more particularly, to allocating processing units in a computer system to generate simulated diffraction signals used in optical metrology.

2. Related Art

In semiconductor manufacturing, periodic gratings are typically used for quality assurance. For example, one typical use of periodic gratings includes fabricating a periodic grating in proximity to the operating structure of a semiconductor chip. The periodic grating is then illuminated with an electromagnetic radiation. The electromagnetic radiation that deflects off of the periodic grating are collected as a diffraction signal. The diffraction signal is then analyzed to determine whether the periodic grating, and by extension whether the operating structure of the semiconductor chip, has been fabricated according to specifications.

In one conventional optical metrology system, the diffraction signal collected from illuminating the periodic grating (the measured-diffraction signal) is compared to one or more simulated-diffraction signals. Each simulated-diffraction signal is associated with a hypothetical profile. When a match is made between the measured-diffraction signal and one of the simulated-diffraction signals, the hypothetical profile associated with the simulated-diffraction signal is presumed to represent the actual profile of the periodic grating.

The simulated-diffraction signals used in optical metrology can be generated using a numerical analysis technique, such as rigorous coupled wave analysis (RCWA). More particularly, in the diffraction modeling technique, a simulated diffraction signal is calculated based, in part, on solving Maxwell's equations. Alternatively, the simulated diffraction signals can be generated using a machine learning system (MLS). Generating the simulated diffraction signal, however, involves performing a large number of complex calculations, which can be time consuming and costly.

SUMMARY

In one exemplary embodiment, in allocating processing units, first and second requests for jobs are obtained. First and second numbers of processing units requested are determined. A first and second numbers of available processing units are determined. When the first number of available processing units is non-zero, the first number of available number of processing units or the first number of processing units requested is assigned to a first processing cluster. A first processing unit in the first processing cluster is designated as a master node. When the second number of available processing units is non-zero, the second number of available number of processing units or the second number of processing units requested is assigned to a second processing cluster. The first processing unit in the second processing cluster is designated as a slave node. The first and second jobs are assigned to the first and second processing clusters, respectively.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

1. Optical Metrology Tools

Figure 1:
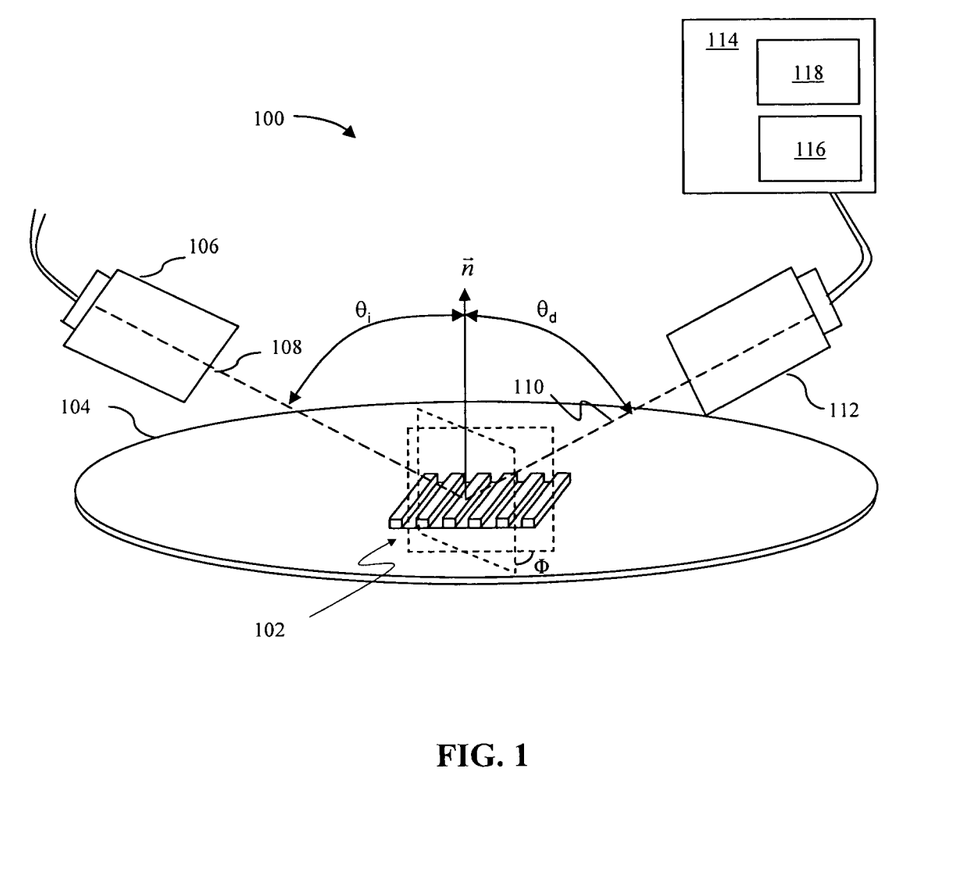
FIG. 1 depicts an exemplary optical metrology system.

With reference to FIG. 1, an optical metrology system 100 can be used to examine and analyze a structure formed on a semiconductor wafer 104. For example, optical metrology system 100 can be used to determine one or more features of a periodic grating 102 formed on wafer 104. As described earlier, periodic grating 102 can be formed in a test pad on wafer 104, such as adjacent to a die formed on wafer 104. Periodic grating 102 can be formed in a scribe line and/or an area of the die that does not interfere with the operation of the die.

As depicted in FIG. 1, optical metrology system 100 can include a photometric device with a source 106 and a detector 112. Periodic grating 102 is illuminated by an incident beam 108 from source 106. The incident beam 108 is directed onto periodic grating 102 at an angle of incidence $\theta_i$ with respect to normal $\vec{n}$ of periodic grating 102 and an azimuth angle $\Phi$ (i.e., the angle between the plane of incidence beam 108 and the direction of the periodicity of periodic grating 102). Diffracted beam 110 leaves at an angle of $\theta_d$ with respect to normal and is received by detector 112. Detector 112 converts the diffracted beam 110 into a measured diffraction signal, which can include reflectance, $\tan(\Psi)$, $\cos(\Delta)$, Fourier coefficients, and the like. Although a zero-order diffraction signal is depicted in FIG. 1, it should be recognized that non-zero orders can also be used. For example, see Ausschnitt, Christopher P., "A New Approach to Pattern Metrology," Proc. SPIE 5375-7, Feb. 23, 2004, pp 1-15, which is incorporated herein by reference in its entirety.

Optical metrology system 100 also includes a processing module 114 configured to receive the measured diffraction signal and analyze the measured diffraction signal. The processing module is configured to determine one or more features of the periodic grating using any number of methods which provide a best matching diffraction signal to the measured diffraction signal. These methods, which are described below, include a library-based process, or a regression based process using simulated diffraction signals obtained by rigorous coupled wave analysis and machine learning systems.

2. Library-based Process of Determining Feature of Structure

In a library-based process of determining one or more features of a structure, the measured diffraction signal is compared to a library of simulated diffraction signals. More specifically, each simulated diffraction signal in the library is associated with a hypothetical profile of the structure. When a match is made between the measured diffraction signal and one of the simulated diffraction signals in the library or when the difference of the measured diffraction signal and one of the simulated diffraction signals is within a preset or matching criterion, the hypothetical profile associated with the matching simulated diffraction signal is presumed to represent the actual profile of the structure. The matching simulated diffraction signal and/or hypothetical profile can then be utilized to determine whether the structure has been fabricated according to specifications.

Thus, with reference again to FIG. 1, in one exemplary embodiment, after obtaining a measured diffraction signal, processing module 114 then compares the measured diffraction signal to simulated diffraction signals stored in a library 116. Each simulated diffraction signal in library 116 can be associated with a hypothetical profile. Thus, when a match is made between the measured diffraction signal and one of the simulated diffraction signals in library 116, the hypothetical profile associated with the matching simulated diffraction signal can be presumed to represent the actual profile of periodic grating 102.

The set of hypothetical profiles stored in library 116 can be generated by characterizing the profile of periodic grating 102 using a profile model. The profile model is characterized using a set of profile parameters. The profile parameters in the set are varied to generate hypothetical profiles of varying shapes and dimensions. The process of characterizing the actual profile of periodic grating 102 using profile model and a set of profile parameters can be referred to as parameterizing.

Figure 2A:
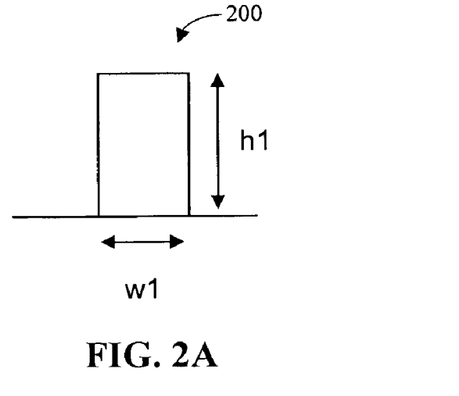
FIGS. 2A-2E depict exemplary profile models.
Figure 2B:
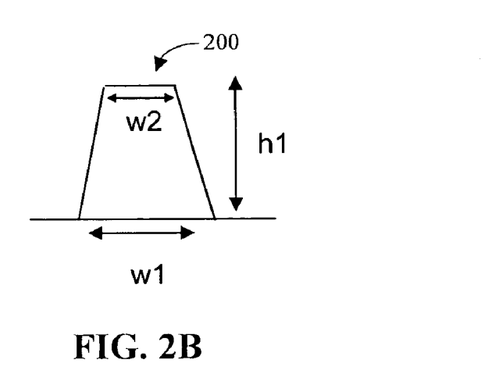
Figure 2C:
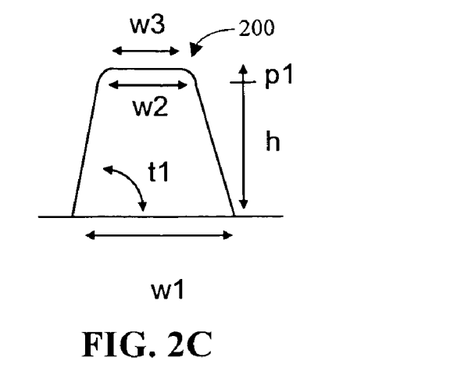
Figure 2D:
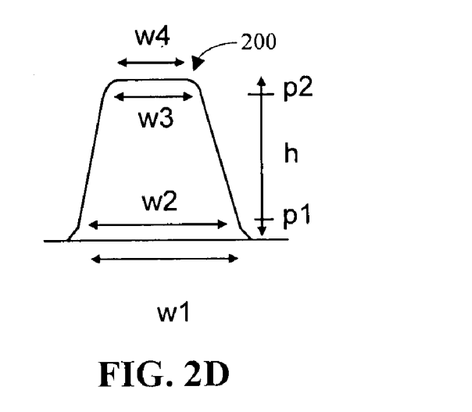
Figure 2E:
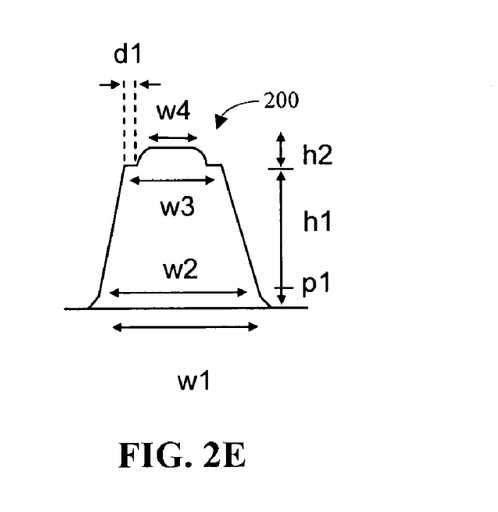

For example, as depicted in FIG. 2A, assume that profile model 200 can be characterized by profile parameters h1 and w1 that define its height and width, respectively. As depicted in FIGS. 2B to 2E, additional shapes and features of profile model 200 can be characterized by increasing the number of profile parameters. For example, as depicted in FIG. 2B, profile model 200 can be characterized by profile parameters h1, w1, and w2 that define its height, bottom width, and top width, respectively. Note that the width of profile model 200 can be referred to as the critical dimension (CD). For example, in FIG. 2B, profile parameter w1 and w2 can be described as defining the bottom CD (BCD) and top CD (TCD), respectively, of profile model 200.

As described above, the set of hypothetical profiles stored in library 116 (FIG. 1) can be generated by varying the profile parameters that characterize the profile model. For example, with reference to FIG. 2B, by varying profile parameters h1, w1, and w2, hypothetical profiles of varying shapes and dimensions can be generated. Note that one, two, or all three profile parameters can be varied relative to one another.

With reference again to FIG. 1, the number of hypothetical profiles and corresponding simulated diffraction signals in the set of hypothetical profiles and simulated diffraction signals stored in library 116 (i.e., the resolution and/or range of library 116) depends, in part, on the range over which the set of profile parameters and the increment at which the set of profile parameters is varied. The hypothetical profiles and the simulated diffraction signals stored in library 116 are generated prior to obtaining a measured diffraction signal from an actual structure. Thus, the range and increment (i.e., the range and resolution) used in generating library 116 can be selected based on familiarity with the fabrication process for a structure and what the range of variance is likely to be. The range and/or resolution of library 116 can also be selected based on empirical measures, such as measurements using AFM, X-SEM, and the like.

For a more detailed description of a library-based process, see U.S. Pat. No. 6,943,900, titled GENERATION OF A LIBRARY OF PERIODIC GRATING DIFFRACTION SIGNALS, filed on Jul. 16, 2001, issued on Sep. 13, 2005, which is incorporated herein by reference in its entirety.

3. Regression-based Process of Determining Feature of Structure

In a regression-based process of determining one or more features of a structure, the measured diffraction signal is compared to a simulated diffraction signal (i.e., a trial diffraction signal). The simulated diffraction signal is generated prior to the comparison using a set of profile parameters (i.e., trial profile parameters) for a hypothetical profile. If the measured diffraction signal and the simulated diffraction signal do not match or when the difference of the measured diffraction signal and one of the simulated diffraction signals is not within a preset or matching criterion, another simulated diffraction signal is generated using another set of profile parameters for another hypothetical profile, then the measured diffraction signal and the newly generated simulated diffraction signal are compared. When the measured diffraction signal and the simulated diffraction signal match or when the difference of the measured diffraction signal and one of the simulated diffraction signals is within a preset or matching criterion, the hypothetical profile associated with the matching simulated diffraction signal is presumed to represent the actual profile of the structure. The matching simulated diffraction signal and/or hypothetical profile can then be utilized to determine whether the structure has been fabricated according to specifications.

Thus, with reference again to FIG. 1, the processing module 114 can generate a simulated diffraction signal for a hypothetical profile, and then compare the measured diffraction signal to the simulated diffraction signal. As described above, if the measured diffraction signal and the simulated diffraction signal do not match or when the difference of the measured diffraction signal and one of the simulated diffraction signals is not within a preset or matching criterion, then processing module 114 can iteratively generate another simulated diffraction signal for another hypothetical profile. The subsequently generated simulated diffraction signal can be generated using an optimization algorithm, such as global optimization techniques, which includes simulated annealing, and local optimization techniques, which includes steepest descent algorithm.

The simulated diffraction signals and hypothetical profiles can be stored in a library 116 (i.e., a dynamic library). The simulated diffraction signals and hypothetical profiles stored in library 116 can then be subsequently used in matching the measured diffraction signal.

For a more detailed description of a regression-based process, see U.S. Pat. No. 6,785,638, titled METHOD AND SYSTEM OF DYNAMIC LEARNING THROUGH A REGRESSION-BASED LIBRARY GENERATION PROCESS, filed on Aug. 6, 2001, issued on Aug. 31, 2004, which is incorporated herein by reference in its entirety.

4. Rigorous Coupled Wave Analysis

As described above, simulated diffraction signals are generated to be compared to measured diffraction signals. As will be described below, the simulated diffraction signals can be generated by applying Maxwell's equations and using a numerical analysis technique to solve Maxwell's equations. It should be noted, however, that various numerical analysis techniques, including variations of RCWA, can be used.

In general, RCWA involves dividing a hypothetical profile into a number of sections, slices, or slabs (hereafter simply referred to as sections). For each section of the hypothetical profile, a system of coupled differential equations is generated using a Fourier expansion of Maxwell's equations (i.e., the components of the electromagnetic field and permittivity ($\epsilon$)). The system of differential equations is then solved using a diagonalization procedure that involves eigenvalue and eigenvector decomposition (i.e., Eigen-decomposition) of the characteristic matrix of the related differential equation system. Finally, the solutions for each section of the hypothetical profile are coupled using a recursive-coupling schema, such as a scattering matrix approach. For a description of a scattering matrix approach, see Lifeng Li, "Formulation and comparison of two recursive matrix algorithms for modeling layered diffraction gratings," J. Opt. Soc. Am. A13, pp 1024-1035 (1996), which is incorporated herein by reference in its entirety. For a more detail description of RCWA, see U.S. Pat. No. 6,891,626, titled CACHING OF INTRA-LAYER CALCULATIONS FOR RAPID RIGOROUS COUPLED-WAVE ANALYSES, filed on Jan. 25, 2001, issued on May 10, 2005, which is incorporated herein by reference in its entirety.

5. Machine Learning Systems

The simulated diffraction signals can be generated using a machine learning system (MLS) employing a machine learning algorithm, such as back-propagation, radial basis function, support vector, kernel regression, and the like. For a more detailed description of machine learning systems and algorithms, see "Neural Networks" by Simon Haykin, Prentice Hall, 1999, which is incorporated herein by reference in its entirety. See also U.S. patent application Ser. No. 10/608,300, titled OPTICAL METROLOGY OF STRUCTURES FORMED ON SEMICONDUCTOR WAFERS USING MACHINE LEARNING SYSTEMS, filed on Jun. 27, 2003, which is incorporated herein by reference in its entirety.

In one exemplary embodiment, the simulated diffraction signals in a library of diffraction signals, such as library 116 (FIG. 1), used in a library-based process are generated using a MLS. For example, a set of hypothetical profiles can be provided as inputs to the MLS to produce a set of simulated diffraction signals as outputs from the MLS. The set of hypothetical profiles and set of simulated diffraction signals are stored in the library.

In another exemplary embodiment, the simulated diffractions used in regression-based process are generated using a MLS, such as MLS 118 (FIG. 1). For example, an initial hypothetical profile can be provided as an input to the MLS to produce an initial simulated diffraction signal as an output from the MLS. If the initial simulated diffraction signal does not match the measured diffraction signal, another hypothetical profile can be provided as an additional input to the MLS to produce another simulated diffraction signal.

FIG. 1 depicts processing module 114 having both a library 116 and MLS 118. It should be recognized, however, that processing module 114 can have either library 116 or MLS 118 rather than both. For example, if processing module 114 only uses a library-based process, MLS 118 can be omitted. Alternatively, if processing module 114 only uses a regression-based process, library 116 can be omitted. Note, however, a regression-based process can include storing hypothetical profiles and simulated diffraction signals generated during the regression process in a library, such as library 116.

6. Allocating Processing Units to Generate Simulated Diffraction Signals

As noted above, generating simulated diffraction signals used in a library-based process or a regression-based process of optical metrology can be time consuming and costly. Thus, in one exemplary embodiment, the simulated diffraction signals are generated using multiple processors in a computer system. It should be recognized that the multiple processors can be multiple computers, multiple central processing units (CPU) within a computer, multiple-cores within a multi-core CPU, multiple execution threads on a hyper-threaded CPU/core, and the like.

Figure 3:
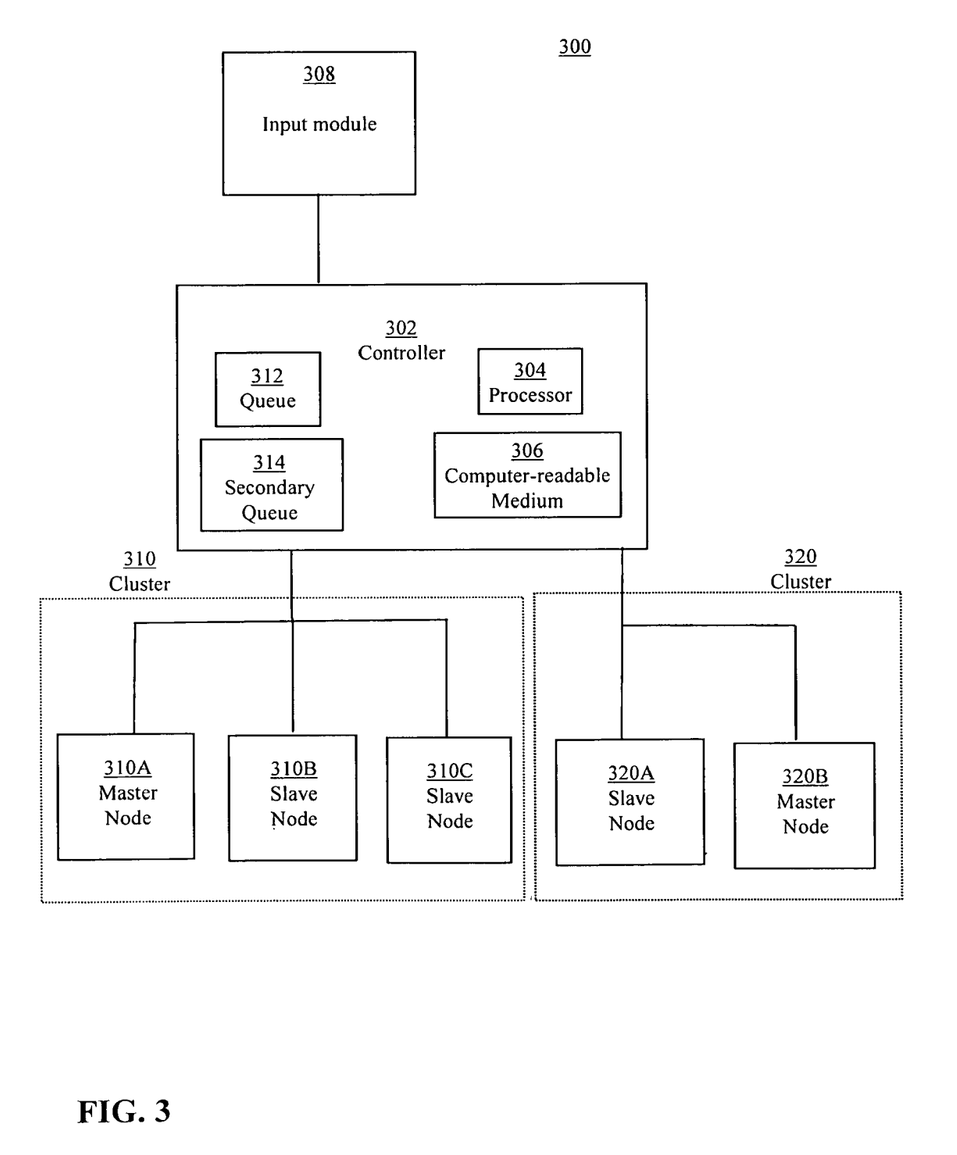
FIG. 3 depicts an example of multiple processing units of a computer system.

For example, FIG. 3 depicts an example of a server farm 300. In this example, server farm 300 is depicted as having a controller 302 and two processing clusters 310 and 320. It is understood that controller 302 may have one or more processing clusters. Any one of the processing units in a processing cluster may be designated as a master node and the remaining processing units in the processing cluster are all slave nodes. Specifically, in processing cluster 310, processing unit 310A is designated as the master node and the other two processing units 310B and 310C are slave nodes. Similarly, in processing cluster 320, processing unit 320B is designated as a master node and processing unit 320A as a slave node. Processing clusters 310 and 320 can be connected together using various well known network architectures. It should be recognized that processing clusters 310 and 320 may include any number of slave nodes. Additionally, server farm 300 can include multiple controllers 302.

The master node 310A of processing cluster 310 and the master node 320B of processing cluster 320 are typically configured as the control center for processing clusters, 310 and 320, respectively. Slave nodes 310B and 310C are typically configured as clients, which receive instructions from master node 310A. A user logs into master node 302 to submit a job to generate simulated diffraction signals. After the submitted job is received, controller 302 assigns the job to master node 310A or master node 320B depending on the number of processing units requested and the number of processing units (e.g., slave nodes 310B and 310C for processing cluster 310 and 320A for processing cluster 320) available. The job is then run on the assigned slave nodes 310B and 310C for processing cluster 310 and 320A for processing cluster 320, and, in particular, the processors in slave nodes 310B and 310C and 320A of processing cluster 320. In some cases, master node 310A and 320B may also be used to run jobs requested by the user. Thus, the nodes of server farm 300 are used as processing units to run the job requested by the user.

The processing units (e.g., slave modes 310A, 310B) can generate the simulated diffraction signals using a numerical analysis technique, such as RCWA, or an MLS. For example, a profile model of a structure to be examined can be provided to one of the processing units. As described above, the profile model is characterized using a set of profile parameters. As also described above, one or more of the profile parameters of the profile model can be varied to generate a set of hypothetical profiles. Thus, the processing unit can be assigned a range of values for one or more profile parameters to be varied to generate an assigned set of hypothetical profiles. The process unit can then generate simulated diffraction signals corresponding to the set of hypothetical profiles using RCWA, MLS, and the like. It should be recognized that the process unit can be provided with the assigned set of hypothetical profiles rather than a profile model with an assigned range of values for one or more profile parameters.

Typically, controller 302 contains a processor 304 and a computer-readable medium 306. Controller 302 may be configured to receive a job requested through an input module 308. Input module 308 may be any component that allows the user to connect to controller 302 through a network, such as a network interface card. Alternatively, input module 308 may be a local terminal having a monitor, mouse and keyboard directly connected to controller 302 through which the user can request a job.

Server farm 300 can also include a queuing system to queue multiple jobs. FIG. 3 depicts a queue 312 of a queuing system as being resident on controller 302. It should be recognized, however, that queue 312 can be resident in various and multiple locations in server farm 300. It should also be recognized that the queuing system can queue multiple jobs according to various well known queuing algorithms.

Figure 4:
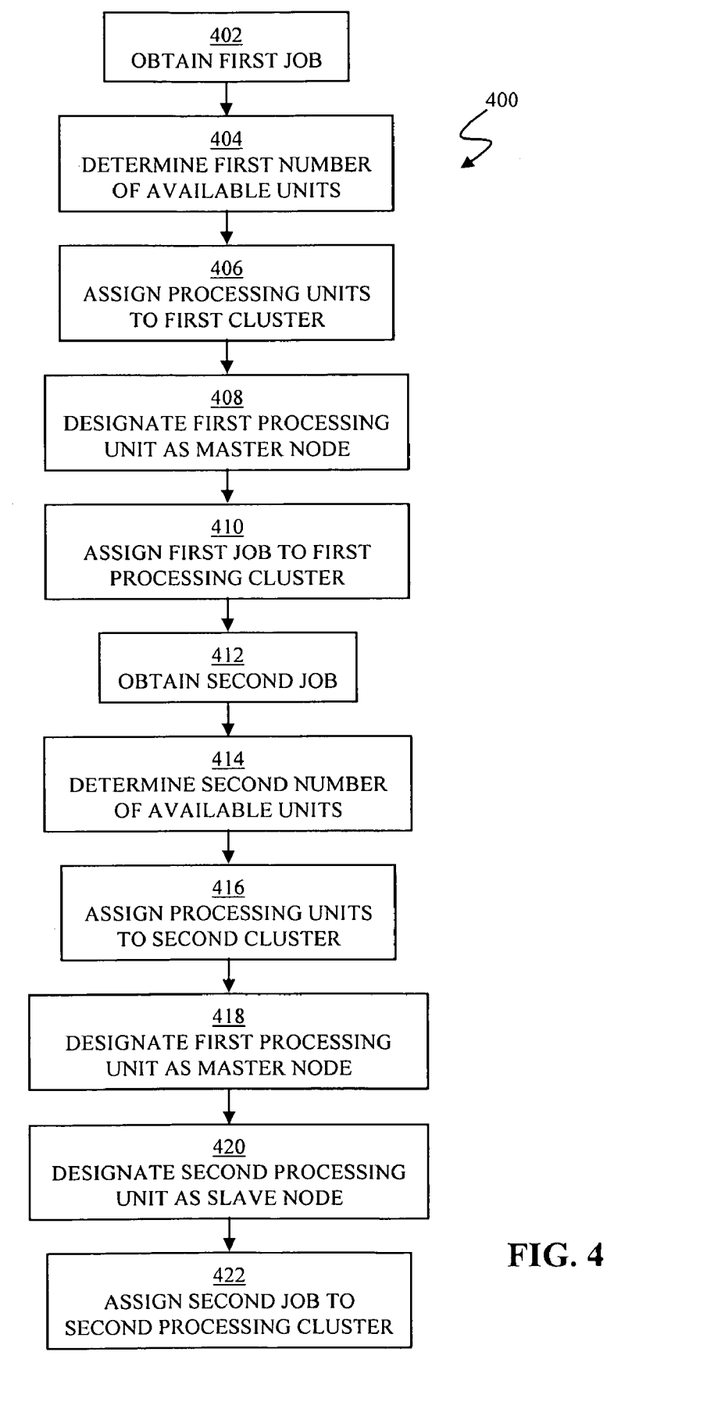
FIG. 4 depicts an exemplary process for allocating processing units to a job.

FIG. 4 depicts an exemplary process 400 for allocating a number of processing units to a job to generate simulated diffraction signals. In step 402, a first job to generate simulated diffraction signals is obtained. The first job specifies a first number of requested processing units ($N_1$) to be used in performing the first job. As described above, typically a user logs into a master node of a server farm, as depicted in FIG. 3, and submits the first job. Typically, the user will determine the first number of processing units needed for a particular job based on the size of the job (i.e., number of processing units required to complete the job) and how quickly the user would like to obtain the results. Other factors, which the user may take into account, include the scalability of the job (i.e., how much performance gain does the user get when they increase the number of processing units). It should be recognized, however, that the first number of requested processing units can be automatically determined using an allocation algorithm.

In step 404, a first number of available processing units ($N_{A1}$) is determined. The first number of available processing units can be determined by determining the number of free processing units present in the computer system. Free processing units are processing units that are not currently processing a job. Additionally, when a queuing system is used with priorities specified for the jobs, availability can be determined based also on the priority of the requested job.

In step 406, when the first number of available processing units is non-zero, the first number of available processing units or the first number of requested processing units is assigned to a first processing cluster of processing units. In particular, if the first number of requested processing units is less than the first number of available processing units, then the first number of requested processing units is assigned to the first processing cluster of processing units. If the first number of requested processing units is not less than the first number of available processing units, then the first number of available processing units is assigned to the first processing cluster of processing units.

In step 408, a first processing unit in the first processing cluster is designated as a master node of the first processing cluster. In step 410, the first job is assigned to the first processing cluster.

In step 412, a second job to generate simulated diffraction signals is obtained. The second job specifies a second number of requested processing units ($N_2$) to be used in performing the second job.

As noted above, a queuing system can be used to queue multiple jobs. When a queuing system is used, the first and second job requests can include priorities specified by the user. The queuing system can then take into account the priorities specified in multiple jobs to queue the multiple jobs for processing by the server farm in accordance with a queuing algorithm. For example, if the first and second jobs are in the queue and the second job has a higher priority than the first job, then the second job can be run before the first job.

In step 414, a second number of available processing units ($N_{A2}$) is determined. The second number of available processing units can be determined by determining the number of free processing units present in the computer system. Free processing units are processing units that are not currently processing a job. Additionally, when a queuing system is used with priorities specified for the jobs, availability can be determined based also on the priority of the requested job.

For example, if the second job has a higher priority than the first job currently running on one or more of the processing units, then the queuing system can make the one or more processing units of the first job available to the second job. As a further example, assume a user requests five processing units for the second job on a server farm containing six processing units. Assume also that three of the processing units are currently processing the first job having a higher priority than the second job. In this scenario, the queuing system determines that three processing units are available for the second job. However, if the first job has a lower priority than the second job, then the queuing system may determine that all six of the processing units are available for the second job. Thus, processing of the first job is stopped at a checkpoint. The second job is then performed. When the second job is completed, the first job is resumed starting at the last checkpoint.

In step 416, when the second number of available processing units is non-zero, the second number of available processing units or the second number of requested processing units is assigned to a second processing cluster of processing units. In particular, if the second number of requested processing units is less than the second number of available processing units, then the second number of requested processing units is assigned to the second processing cluster of processing units. If the second number of requested processing units is not less than the second number of available processing units, then the second number of available processing units is assigned to the second processing cluster of processing units.

When the second number of available processing units or the second number of requested processing units is assigned to the second processing cluster of processing units, the first processing unit in the first processing cluster is one of the processing units in the second processing cluster. In step 418, the first processing unit in the second processing cluster is designated as a slave node of the second processing cluster. In step 420, a second processing unit in the second processing cluster is designated as a master node of the second processing cluster. In step 422, the second job is assigned to the second processing cluster.

Thus, in the present exemplary embodiment, one node (e.g., the first processing unit described above) can be designated as a master node in one processing cluster (e.g., the first processing cluster described above), then designated as a slave node in another processing cluster (e.g., the second processing cluster described above). Similarly, one node can be designated as a slave node in one processing cluster, then designated as a master node in another processing cluster.

It should be recognized that although at least one processing unit must be common between the first processing cluster and the second processing cluster, any number of the remaining processing units in the first and second processing clusters may be the same or different. For example, in the example described above, although the first processing unit is common between the first and second processing clusters, the processing unit in the second processing cluster that is designated as the new master node for the second processing cluster can be one of the processing units in the first processing cluster assigned as a slave node for the first processing cluster. Alternatively, the processing unit in the second processing cluster that is designated as the new master node for the second processing cluster can be a processing unit that was not one of the processing units in the first processing cluster.

Figure 5:
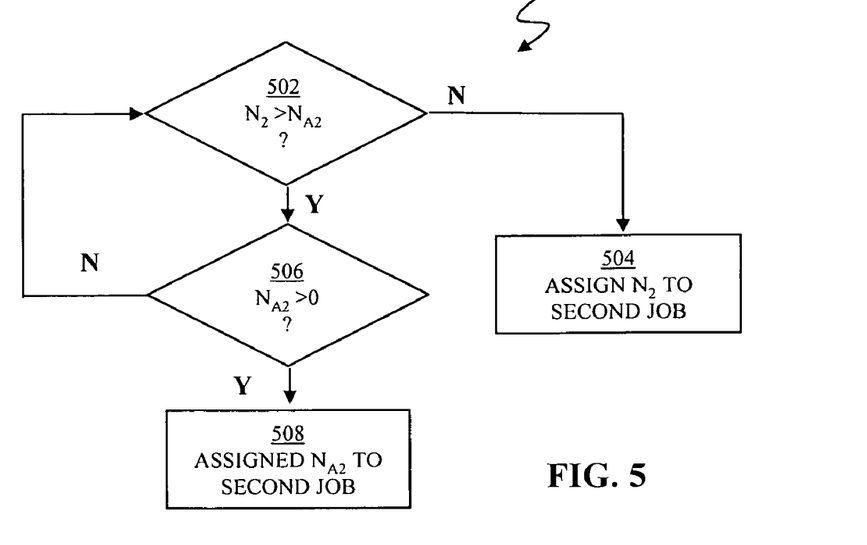
FIG. 5 depicts an exemplary of assigning a job to a processing cluster.

With reference to FIG. 5, an exemplary process 500 of assigning a job to a processing cluster is depicted. For the sake of clarity, exemplary process 500 is described below in the context of assigning the second job described above to the second processing cluster. It should be recognized, however, that exemplary 500 can be used to assign any job to any processing cluster.

In step 502, the second number of requested processing units ($N_2$) is compared to the second number of available processing units ($N_{A2}$). If the second number of requested processing units is less than or equal to the second number of available processing units, then, in step 504, the second number of requested processing units is assigned to the second job. If the second number of requested processing units is greater than the second number of available processing units, then, in step 506, a determination is made as to whether the second number of available processing units is greater than zero. If the second number of available processing units is greater than zero, then, in step 508, the second number of available processing units is assigned to the second job. If the second number of available processing units is zero, then steps 502-506 are repeated until the second job gets assigned the second number of requested processing units or the second number of available processing units.

In one exemplary embodiment, when a queuing system is used, a priority can be specified such that when the second job is obtained from the queue and the second number of available processing units ($N_{A2}$) is greater than the second number of requested processing units ($N_2$) and the queue is empty after the second job is obtained from the queue, the second job is assigned the second number of available processing units ($N_{A2}$) rather than the second number of requested processing units ($N_2$). For example, assume the second job in the queue requests four processing units (i.e., $N_2$=4). Assume also that when the second job is obtained from the queue to be run there are six available processing units (i.e., $N_{A2}$=6) and the queue is empty. Thus, in the present exemplary embodiment, at step 508, six processing units are assigned to run the second job even though the second job requested only four processing units.

With reference again to FIG. 3, in one exemplary embodiment, when the second job has been assigned to less than the second number of requested processing units ($N_2$), the second job is logged in a secondary queue 314. It should be recognized that secondary queue 314 can be maintained in various locations and formats. For example, secondary queue 314 can be maintained in computer-readable medium 306 of controller 302. Additionally, it should be recognized that queue 312 and secondary queue 314 can be portions of a single queue.

Figure 6:
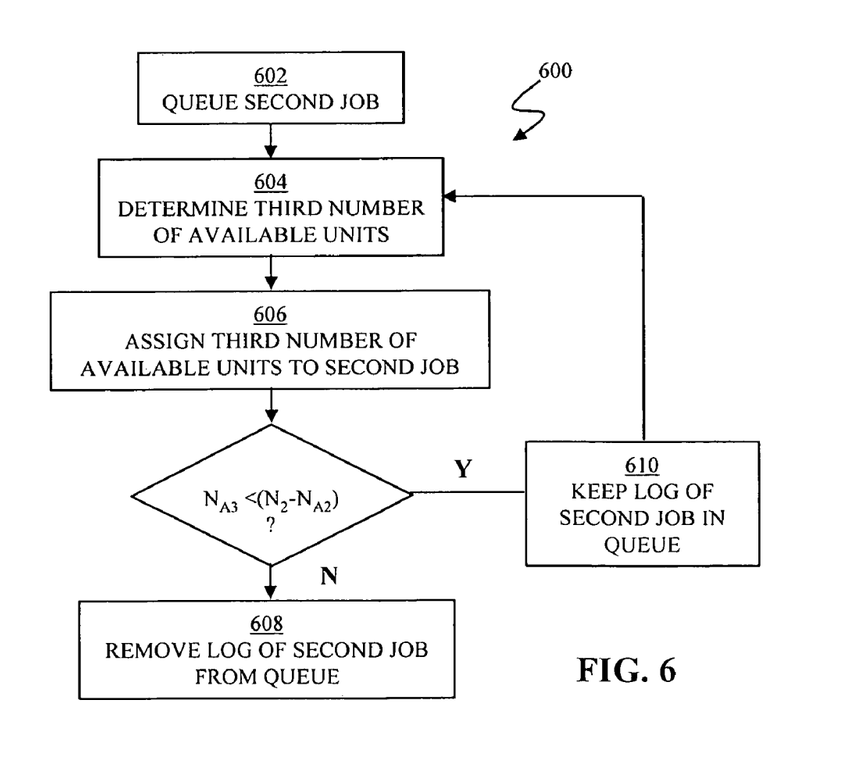
FIG. 6 depicts a process for re-assigning a number of processing units to a job.

FIG. 6 depicts an exemplary process 600 for re-assigning a job that has been assigned to less than the number of requested processing units for the job. Again, for the sake of clarity, process 600 will be described below in the context of the assigning the second job described above to the second processing cluster. It should be recognized, however, that exemplary 600 can be used to re-assign any job to any processing cluster.

In step 602, the second job is logged in a secondary queue. In step 604, a third number of available processing units ($N_{A3}$) is determined. In step 606, if the third number of available processing units ($N_{A3}$) is non-zero, then the third number of available processing units ($N_{A3}$) is assigned to the second job.

In step 608, if the third number of available processing units ($N_{A3}$) is equal to or greater than the difference between the second number of processing units requested for the second job and the second number of available processing units ($N_2-N_{A2}$), then the second job is removed from the secondary queue. In step 610, if the third number of available processing units ($N_{A3}$) is less than the difference between the second number of processing units requested for the second job and the second number of available processing units ($N_2-N_{A2}$), then the second job continues to be logged in the secondary queue and steps 604 and 606 are repeated.

As an example, assume a server farm has six processing units and that a first job is being processed using three of the six processing units. Now assume a second job is received that requests five processing units. In this example, in accordance with process 500 (FIG. 5), the second job is assigned to the three available processing units rather than the requested five processing units. In step 602 of process 600, because the second job was assigned to less processing units than requested, the second job is logged in the secondary queue.

Now assume that the first job is completed and the three processing units running the first job become available. The third number of available processing units is three (i.e., $N_{A3}$=3), which does not include the three processing units currently running the second job. In step 606, because the third number of available processing units is non-zero, the three processing units are assigned to the second job. In step 608, because the third number of processing units is equal to or greater than the difference between the second number of processing units requested for the second job and the second number of available processing units (i.e., 3>(5−3)), the second job is removed from the secondary queue. If, however, only one additional processing unit had become available, the additional process unit would have been assigned to the second job in step 606, but the second job would have remained in the secondary queue.

With reference again to FIG. 3, the processor 304, of the controller 302, in FIG. 3, may be configured to perform the steps of process 400 (FIG. 4), process 500 (FIG. 5), and/or process 600 (FIG. 6). Additionally, process 400 (FIG. 4), process 500 (FIG. 5), and/or process 600 (FIG. 6) may be stored in the computer-readable medium 306 of the controller 302 as computer executable instructions, which can be executed by processor 304.

In one exemplary embodiment, the simulated diffraction signals generated by the multiple processing units can be used in optimizing a profile model of a structure formed on a wafer. In particular, an initial optical metrology model can be defined for a structure to be examined. Simulated diffraction signals can be generated for the initial optical metrology model using multiple processing units. The one or more simulated diffraction signals can be compared to a measured diffraction signal of the structure. The results of this comparison can be evaluated using one or more termination criteria, such as a cost function, goodness of fit (GOF), and the like. If the one or more termination criteria are not met, the initial optical metrology model can then be altered to generate a refined optical metrology model. The process of generating diffraction signals and comparing the diffraction signals to the measured diffraction signal can be repeated. This process of altering the optical metrology model can be repeated until the one or more termination criteria are met to obtain an optimized metrology model. For detailed description of metrology model optimization, refer to U.S. patent application Ser. No. 10/206,491, OPTIMIZED MODEL AND PARAMETER SELECTION FOR OPTICAL METROLOGY, by Vuong, et al., filed Jun. 27, 2002; and U.S. patent application Ser No. 11/061,303, OPTICAL METROLOGY OPTIMIZATION FOR REPETITIVE STRUCTURES, by Vuong, et al., filed on Apr. 27, 2004, both of which are incorporated herein by reference in their entireties.

In another exemplary embodiment, the simulated diffraction signals generated by the multiple processing units can be used in a regression-based process of optical metrology. In particular, in a regression-based process, a measured diffraction signal of a structure can be compared to one simulated diffraction signal generated using one of the multiple processing units. If the diffraction signals do not match within a matching criterion, the measured diffraction signal can be compared to another simulated diffraction signal generated by another one of the multiple processing units. As noted above, the simulated diffraction signals used during the regression process can be stored in a dynamic library for subsequent use.

In still exemplary embodiment, the simulated diffraction signals generated by the multiple processing units can be used in a library-based process of optical metrology. In particular, in a library-based process, the simulated diffraction signals and hypothetical profiles corresponding to the simulated diffraction signals are stored in a library. A measured diffraction signal of a structure is then compared to one or more simulated diffraction signals stored in the library. The hypothetical profile corresponding to the best matching simulated diffraction signal is assumed to represent the profile of the structure.

In yet another exemplary embodiment, the multiple processing units can be used to optimize a profile model, perform a regression process using the optimized profile model, generate a library using the optimized profile model, then verify the generated library. In particular, as described above, simulated diffraction signals generated by the multiple processing units can be used to optimize a profile model. As also described above, the simulated diffraction signals generated by the multiple processing units can be used in a regression-based process. In the present embodiment, the regression-based process is performed using the profile model optimized using the simulated diffraction signals generated using the multiple processing units. It should be recognized that the simulated diffraction signals used in the regression-based process can be the same or different than the simulated diffraction signals used to optimize the profile model.

After performing the regression-based process, the simulated diffraction signals generated by the multiple processing units can be used to generate a library of simulated diffraction signals and hypothetical profiles. In the present exemplary embodiment, the hypothetical profiles in the library are generated based on the optimized profile model, and the simulated diffraction signals in the library are generated using the multiple processing units. It should be recognized that the simulated diffraction signals used to generate the library can be the same or different than the simulated diffraction signals used to perform the regression-based process and/or to optimize the profile model.

After the library is generated, the multiple processing units can be used to verify the generated library. For example, the generated library can be verified by obtaining a set of measured diffraction signals, and then comparing the set of measured diffraction signals to the simulated diffraction signals in the generated library to determine best matching diffraction signals. The multiple processing units can be used to expedite the process of comparing the set of measured diffraction signals to the simulated diffraction signals in the generated library.

Although exemplary embodiments have been described, various modifications can be made without departing from the spirit and/or scope of the present invention. Therefore, the present invention should not be construed as being limited to the specific forms shown in the drawings and described above.

We claim:

1. A method of utilizing computer-executable instructions for allocating processing units of a computer system to generate simulated diffraction signals in optical metrology, the computer system having a controller and a plurality of processing units, the controller configured to perform allocation of processing units, the method comprising:
   a) obtaining a first request for a first job to generate simulated diffraction signals using multiple processing units of the computer system;
   b) determining a first number of requested processing units for the first job to generate simulated diffraction signals;
   c) determining a first number of available processing units;
   d) when the first number of available processing units is non-zero,
      assigning the first number of available number of processing units or the first number of requested processing units to a first processing cluster of processing units;
      designating a first processing unit in the first processing cluster as a master node of the first processing cluster; and
      assigning the first job to the first processing cluster;
   e) obtaining a second request for a second job to generate simulated diffraction signals using multiple processing units;
   f) determining a second number of requested processing units for the second job to generate simulated diffraction signals;
   g) determining a second number of available processing units; and
   h) when the second number of available processing units is non-zero,
      assigning the second number of available number of processing units or the second number of requested processing units to a second processing cluster of processing units, wherein the first processing unit in the first processing cluster is one of the processing units in the second processing cluster;
      designating the first processing unit in the second processing cluster as a slave node of the second processing cluster;
      designating a second processing unit in the second processing cluster as a master node of the second processing cluster; and
      assigning the second job to the second processing cluster.

2. The method of claim 1, wherein the second processing unit in the second processing cluster was one of the processing units in the first processing cluster, and wherein the second processing unit in the first processing cluster was designated as a slave node of the first processing cluster.

3. The method of claim 1, wherein the second processing unit in the second processing cluster was not one of the processing units in the first processing cluster.

4. The method of claim 1, further comprising:
   after d) and h), obtaining the simulated diffraction signals generated by the first and second processing clusters; and comparing the obtained simulated diffraction signals to one or more measured diffraction signals of a structure formed on a wafer to optimize one or more profile models of the structure.

5. The method of claim 4, further comprising:
determining a profile of the structure in a regression process using an optimized profile model and simulated diffraction signals generated by the first and second processing clusters.

6. The method of claim 4, further comprising:
generating a library of simulated diffraction signals and hypothetical profiles of the structure, wherein the hypothetical profiles are generated based on an optimized profile model, and wherein the simulated diffraction signals in the library are generated by the first and second processing clusters.

7. The method of claim 6, farther comprising:
verifying the generated library using the first and second processing clusters.

8. The method of claim 1, farther comprising:
after d) and h), obtaining the simulated diffraction signals generated by the first and second processing clusters; and
comparing the obtained simulated diffraction signals to one or more measured diffraction signals of a structure formed on a wafer in a regression process to determine a profile of the structure.

9. The method of claim 1, further comprising:
after d) and h), obtaining the simulated diffraction signals generated by the first and second processing clusters; and
storing the obtained simulated diffraction signal and hypothetical profiles corresponding to the obtained simulated diffraction signals in a library.

10. The method of claim 1, wherein when the second number of available processing units determined in g) is less than the second number of requested processing units in f), the second number of available processing units is assigned to the second processing cluster of processing units in step h), and farther comprising:
logging the second job in a secondary queue.

11. The method of claim 10, farther comprising:
after logging the second job in the secondary queue,
determining a third number of available processing units;
when the third number of available processing units is non-zero, assigning an additional number of processing units to the second processing cluster, wherein the additional number of processing units is equal to or less than the third number of available processing units;
when the additional number of processing units is less than the difference between the second number of requested processing units in f) and the second number of available processing units determined in g), maintaining the log of the second job in the secondary queue; and
when the additional number of processing units is equal to or greater than the difference between the second number of requested processing units in f) and the second number of available processing units determined in g), removing the log of the second job from the secondary queue.

12. The method of claim 1, further comprising:
queuing jobs in a queue, wherein the first and second jobs obtained in a) and e) are obtained from the queue based on priorities assigned to the jobs.

13. The method of claim 12, further comprising:
when the first job is currently being processed, the second job is obtained from the queue with a higher priority than the first job currently being processed, and the second number of requested processing units by the second job is greater than the second number of available processing units:
stopping the first job at a checkpoint;
running the second job; and
when the second job is completed, resuming the first job at the checkpoint.

14. The method of claim 12, further comprising:
when the queue is empty after the second job is obtained from the queue and the second number of available process units is greater than the second number of requested processing units by the second job obtained from the queue, assigning the second number of available processing units to the second processing cluster rather than the second number of requested processing units by the second job.

15. A computer-readable medium containing computer-executable instructions for allocating processing units of a computer system to generate simulated diffraction signals in optical metrology, the computer system having a controller and a plurality of processing units, the controller configured to perform allocation of processing units, the computer-readable medium comprising instructions for:

a) obtaining a first request for a first job to generate simulated diffraction signals using multiple processing units of the computer system;

b) determining a first number of requested processing units requested-for the first job to generate simulated diffraction signals;

c) determining a first number of available processing units;

d) when the first number of available processing units is non-zero,
assigning the first number of available number of processing units or the first number of requested processing units to a first processing cluster of processing units;
designating a first processing unit in the first processing cluster as a master node of the first processing cluster; and
assigning the first job to the first processing cluster;

e) obtaining a second request for a second job to generate simulated diffraction signals using multiple processing units;

f) determining a second number of requested processing units for the second job to generate simulated diffraction signals;

g) determining a second number of available processing units; and h) when the second number of available processing units is non-zero,
assigning the second number of available number of processing units or the second number of requested processing units to a second processing cluster of processing units, wherein the first processing unit in the first processing cluster is one of the processing units in the second processing cluster;
designating the first processing unit in the second processing cluster as a slave node of the second processing cluster;
designating a second processing unit in the second processing cluster as a master node of the second processing cluster; and assigning the second job to the second processing cluster.

16. The computer-readable medium of claim 15, wherein the second processing unit in the second processing cluster was one of the processing units in the first processing cluster, and wherein the second processing unit in the first processing cluster was designated as a slave node of the first processing cluster.

17. The computer-readable medium of claim 15, wherein the second processing unit in the second processing cluster was not one of the processing units in the first processing cluster.

18. The computer-readable medium of claim 15, further comprising instructions for:
   after d) and h), obtaining the simulated diffraction signals generated by the first and second processing clusters; and
   comparing the obtained simulated diffraction signals to one or more measured diffraction signals of a structure formed on a wafer to optimize one or more profile models of the structure.

19. A system for allocating processing units of a computer system to generate simulated diffraction signals in optical metrology, the system comprising:
   a plurality of processing units configured to generate simulated diffraction signals; and
   a controller configured to:
   a) obtain a first request for a first job to generate simulated diffraction signals using multiple processing units;
   b) determine a first number of requested processing units for the first job to generate simulated diffraction signals;
   c) determine a first number of available processing units;
   d) when the first number of available processing units is not zero,
      assign the first number of available number of processing units or the first number of requested processing units to a first processing cluster of processing units;
      designate a first processing unit in the first processing cluster as a master node of the first processing cluster; and
      assign the first job to the first processing cluster;
   e) obtain a second request for a second job to generate simulated diffraction signals using multiple processing units;
   f) determine a second number of requested processing units for the second job to generate simulated diffraction signals;
   g) determine a second number of available processing units; and
   h) when the second number of available processing units is not zero,
      assign the second number of available number of processing units or the second number of requested processing units to a second processing cluster of processing units, wherein the first processing unit in the first processing cluster is one of the processing units in the second processing cluster;
      designate the first processing unit in the second processing cluster as a slave node of the second processing cluster;
      designate a second processing unit in the second processing cluster as a master node of the second processing cluster; and
      assign the second job to the second processing cluster.

20. The system of claim 19, wherein the second processing unit in the second processing cluster was one of the processing units in the first processing cluster, and wherein the second processing unit in the first processing cluster was designated as a slave node of the first processing cluster.

21. The system of claim 19, wherein the second processing unit in the second processing cluster was not one of the processing units in the first processing cluster.

* * * * *